United States Patent
Karp et al.

(10) Patent No.: US 8,091,137 B2
(45) Date of Patent: Jan. 3, 2012

(54) TRANSFERRING A DATA OBJECT BETWEEN DEVICES

(75) Inventors: Alan H. Karp, Palo Alto, CA (US); Antonius A. C. M. Kalker, Carmel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1080 days.

(21) Appl. No.: 11/590,118

(22) Filed: Oct. 31, 2006

(65) Prior Publication Data

US 2008/0104706 A1    May 1, 2008

(51) Int. Cl.
G06F 7/04      (2006.01)
H04N 7/167    (2011.01)

(52) U.S. Cl. .......................................... 726/26; 380/201
(58) Field of Classification Search .................... 726/26; 380/201
See application file for complete search history.

(56) References Cited

U.S. PATENT DOCUMENTS

| | | | |
|---|---|---|---|
| 6,550,011 B1 * | 4/2003 | Sims, III ...................... | 713/193 |
| 7,113,912 B2 | 9/2006 | Stefik et al. | |
| 7,383,446 B1 * | 6/2008 | Hatanaka et al. ............. | 713/193 |
| 2002/0025042 A1 * | 2/2002 | Saito .............................. | 380/258 |
| 2005/0177742 A1 | 8/2005 | Benson et al. | |
| 2005/0273629 A1 * | 12/2005 | Abrams et al. ................ | 713/189 |
| 2005/0289068 A1 * | 12/2005 | Stefik et al. .................... | 705/51 |
| 2006/0020631 A1 | 1/2006 | Wan et al. | |
| 2006/0106727 A1 * | 5/2006 | Yellai et al. .................... | 705/59 |
| 2006/0107046 A1 * | 5/2006 | Raley et al. .................... | 713/168 |
| 2006/0149676 A1 | 7/2006 | Sprunk et al. | |
| 2006/0282511 A1 * | 12/2006 | Takano et al. ................. | 709/217 |
| 2007/0124250 A1 | 5/2007 | Yamashima et al. | |
| 2009/0151000 A1 * | 6/2009 | Okamoto et al. .............. | 726/26 |

FOREIGN PATENT DOCUMENTS

| | | |
|---|---|---|
| DE | 112004002943 T5 | 6/2007 |
| JP | 07-056507 | 3/1995 |
| JP | 11-331145 | 11/1999 |
| JP | 2002-288377 | 10/2002 |
| JP | 2002-358242 | 12/2002 |
| JP | 2006-085481 | 3/2006 |
| WO | PCT-2006022006 A1 | 3/2006 |

OTHER PUBLICATIONS

Key Transfer Manager, http://www.wavesys.com/products/ktm.html, downloaded Aug. 10, 2006.
Japanese Office Action (with English translation) ~ dated Sep. 7, 2010 ~ Japanese Patent Application No. 2009-534710.
German Office Action dated Jul. 21, 2011 (in German).

* cited by examiner

*Primary Examiner* — Techane Gergiso (57) ABSTRACT

A playable copy of the digital content object is stored at a first device. A data object associated with the digital content object is sent to a second device. The playable copy of the digital content object is disabled at the first device, such that only an authorized, playable copy of the digital content object is operable to be stored on the first and second device at any given time before, during and after sending the data object.

17 Claims, 12 Drawing Sheets

TRANSFERRING A DATA OBJECT BETWEEN DEVICES

BACKGROUND

Digital rights management is a great concern for digital content owners, such as owners of songs, movies, electronic books, and other types of digital media. Content owners try to sell and distribute their content in such a way to prevent the illegal copying of their content. For example, content, such as movies are widely sold and distributed on digital video discs (DVDs). To prevent illegal copying DVDs typically include copy protection mechanisms that prevent users from making copies. However, users still have the ability to play the DVDs on many devices without making copies by transferring the DVDs to each device as needed. Also, based on the legal principle of "right of first sale" users may legally sell the DVDs if desired without making a copy by simply giving the DVDs to the next owner.

It has currently become very convenient and popular to purchase and download digital content, such as purchasing and downloading songs or other types of content via the Internet or purchasing movies or other events on-demand from a cable or satellite provider. When digital content is stored locally on a user device in an unprotected format, the user may have the ability to make multiple copies of the content. Unlike a compact disc (CD) or DVD which is transferred manually between user devices without making copies, the user of locally-stored content may have the ability to store unlicensed copies of the content on several devices simultaneously and may have the ability to keep a copy of the content and distribute copies of the content to other users. Thus, without appropriate Digital Rights Management (DRM) technologies, it is difficult for the content owners to regulate the unlicensed copying and distribution of their content. In practice, most online content delivery stores use some form of DRM technology to protect against unauthorized copying. However, unlike a physical CD or DVD, in many instances, the DRM technology prevents the user from transferring purchased, downloaded content between several devices, such as between a portable music player and a home stereo, or transferring content to a device of a new owner that purchased the content from a user that originally purchased and downloaded the content.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

For simplicity and illustrative purposes, the principles of the embodiments are described. However, one of ordinary skill in the art would readily recognize that the same principles are equally applicable to, and can be implemented using variations of the described embodiments.

According to an embodiment, digital content is virtually provided with physical transfer properties so a playable copy of the digital content can be transferred between devices similar to a physical medium, such as a CD or DVD, without creating playable, unauthorized copies of the content. Digital content may include audio, video, still images, text, or other types of media, or any combination of different types of content, such as multimedia content.

Figure 1A:
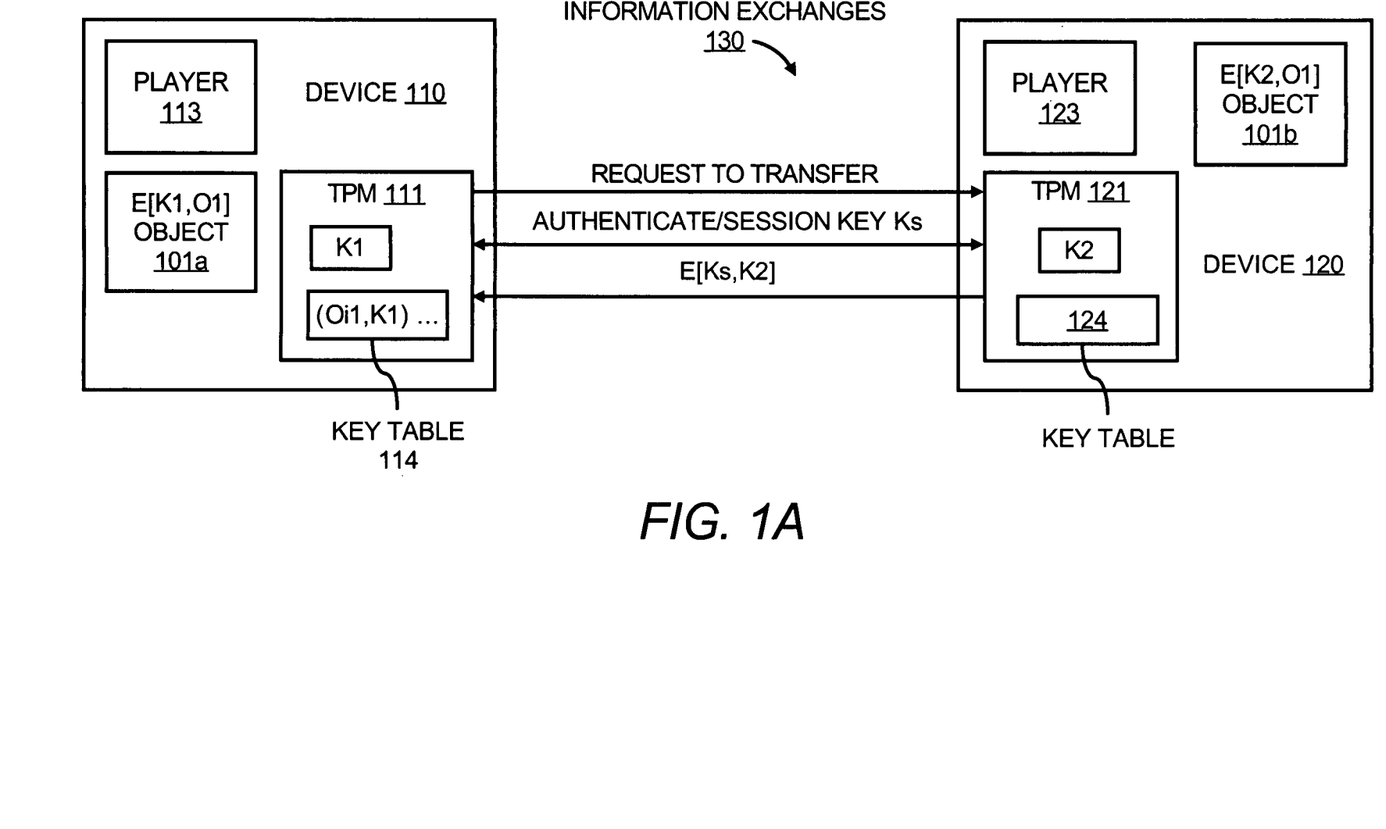
FIGS. 1A-B illustrate transferring a data object between devices, according to an embodiment.
Figure 1B:
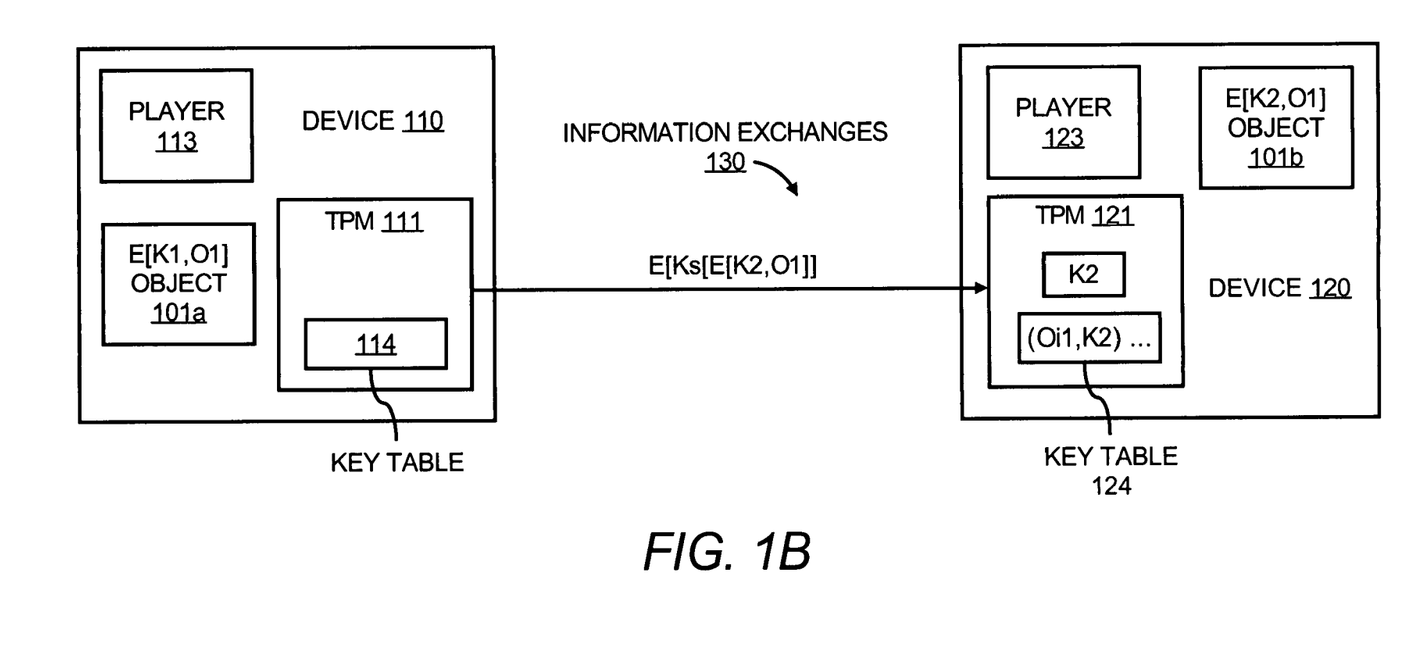

FIGS. 1A-B illustrate an embodiment of transferring a digital content object O1 between a device 110 and a device 120, wherein at any given time, including prior to, subsequent to, or during the transfer, no unauthorized, playable copies of the digital content object are available. A digital content object is a unit of digital content, which may include a file or some other data structure for storing digital content. A playable copy of a digital content object is the digital content that can be played by a device. For example, in some situations, a device may store an encrypted digital content object, but does not have the encryption key for decrypting the digital content object. In those situations, the device does not have a playable copy until it receives the encryption key for decrypting the digital content object.

An encryption key is a key that is used to perform encryption, decryption or both encryption and decryption. Furthermore, an encryption key may be used to decrypt a digital content object to make it playable or encryption key may be used to access one or more other encryption keys to decrypt a digital content object to make it playable.

An authorized copy is digital content authorized by an entity regulating the digital content, such as digital content licensed or purchased from the content owner. A user may be authorized to have more than one copy and those copies are referred to as a number of authorized copies.

A data object is data associated with a digital content object. For example, the data object may be a data element that makes the data object playable, such as an encryption key, which may include a locker key or content key described below. The data object may be the encrypted digital content object or the data object is a combination of both, such as an encrypted digital content object. The data object may also include a copy regulation value if more than one authorized copy is being transferred to another device.

The devices 110 and 120 may include any device operable to store digital content objects. The devices 110 and 120 may also be operable to play the digital content objects for example using a software player. Examples of the devices are personal computers, servers, portable media content players, such as MP3 players, cellular phones, stereos, radios, DVD players, CD players, and other user devices.

FIG. 1A-B show the devices 110 and 120, each having a trusted platform module (TPM) 111 and 121, respectively. A TPM is tamper resistant hardware that has some software. A TPM may have a processor or processing circuitry and a limited amount of volatile and nonvolatile memory. The TPM may be a chip in a device that is separate from other hardware in the device. The TPM may store keys and have the ability to perform cryptographic operations, such as creating and deleting encryption keys and encryption/decryption, and create and sign digital certificates. Standards and specifications for TPMs may be provided by the Trusted Computing Group (TCG) organization.

A TPM is one type of trusted hardware that may be used in the embodiments described herein to transfer data objects between devices. It will be apparent to one of ordinary skill in the art that other types of trusted hardware may instead be used. Trusted hardware may include hardware that is tamper resistant and that can be authenticated.

TPMs are conventionally used for attestation of software to be executed on a device. For example, a TPM may be used to verify in the following order the authenticity of a BIOS, an operating system (OS), and applications to be executed on the device before running the BIOS, OS and applications on the device. According to an embodiment, the TPMs 111 and 121 are used to assist in securely transferring data objects between the devices 110 and 120, as described in detail below.

Each of the TPMs 111 and 121 is operable to privately store data objects, digital certificates and other information internally or in external memory secured by the TPM, for example, through use of a locker key. Digital certificates may be used to verify that a key belongs to a TPM. For example, a TPM may send a digital certificate having its public key to verify to the recipient that the TPM has the associated private key for asymmetric encryption. Also, each of the TPMs 111 and 121 has a unique identity. For example, the unique identity of the TPM may be a digital digest, such as a hash, of the TPMs public key if asymmetric encryption is used to encrypt/decrypt digital content.

Digital content may be kept encrypted except for the purposes of playing the digital content or for performing some steps to transfer digital content in some embodiments. Symmetric or asymmetric encryption may be used to encrypt digital content. If symmetric encryption, such as AES, is used to encrypt digital content, then the encryption/decryption key is K. Encrypted digital content is denoted as E[K,O], where O represents a digital content object, which is a unit of digital content, such as a file. Instead of symmetric encryption, asymmetric encryption may be used to encrypt and decrypt digital contents as described in further detail below. The asymmetric keys are denoted as Ku (public key) and Kr (private key), where Kr is only known by the TPM using the asymmetric key. Different TPMs have different asymmetric key pairs. Also, keys used to encrypt or decrypt digital content are referred to as content keys. In addition, keys may be used to encrypt content keys or to privately store keys and other information in storage external to the TPM, and these keys are referred to as locker keys or binding keys.

Digital content objects have unique object identifiers Oi and corresponding keys K for encrypting and decrypting the digital content identified by the identifier. Each of the TPMs 111 and 121 may store digital content object ID/key pairs {(Oi1,K)} that are not accessible without authorization from the TPMs either in the TPM itself or in secure external storage managed by the TPM. The digital content object ID/key pairs {(Oi1,K)} are used for playing and transferring digital content objects. The digital content object identifier may be used to search the pairs to find the corresponding key. Digital content object ID/key pairs are shown in the TPM 111. For example, pairs such as (Oi1,K1) and other pairs, such as (Oi2, K4), (Oi3,K7), etc. may be stored in the key table 114 and similar pairs may be stored in the key table 124, such as (Oi1,K2). . . . The digital content object ID/key pairs may include an identifier of the digital content objects and an identifier of the corresponding keys. FIG. 1 shows the actual keys K1, K4 and K7 also stored in the TPM 111. Digital content objects may be stored in the TPM 111 if memory size permits. In other embodiments, the key table 114 and the keys are stored in external storage secured by a TPM in embodiments described herein. Also, keys and/or entries in the key table may be deleted to disable a digital content object such that the digital content object cannot be played on the device. For example, K2 may at one time during the transfer process be stored in the TPM 111 and then deleted. K1 may also be deleted from the TPM 111. Also, in this embodiment, the content key is symmetric and is varied for each digital content object. In other embodiments, the content key may be the same for each digital content object, and then the table 114 may only store digital content object identifiers. In other embodiments, the content key or locker key is asymmetric and may be the same for each digital content object or may be varied.

Each of the devices 110 and 120 may include players 113 and 123 respectively for playing digital content objects. The players 113 and 123 may include media players that are known in the art. The players 113 and 123 for example are software that run on an OS and are operable to play media content, such as video and audio content.

Regarding playing digital content objects, the players 113 and 123 decrypt encrypted digital content objects and play the digital content objects. For example, on the device 110, the player 113 receives the digital content object O1 encrypted with the key K1. This is shown as E[K1,O1]. The player 113 requests the decryption key from the TPM 111 by sending the digital content object identifier Oi1 for the digital content object O1 to the TPM 111. The TPM 111 authenticates the player 113 before sending the decryption key to ensure the player is not maliciously attempting to get the decryption key for unauthorized use. The TPM 111 searches its stored digital content object ID/key pairs to retrieve the corresponding key K1 and sends the key K1 to the player 113. If the player 113 or any underlying software, such as the operating system, has been tampered with, which may be determined by validating the embedded signatures of the underlying software, the TPM 111 will not deliver the key K1 to the player 113.

The player 113 decrypts the digital content object O1 with the key K1. The player 113 then plays the digital content object O1. The player 113 may not make the decrypted digital content object O1, E[K,O1], or the key K available outside the player 113 to prevent unauthorized copying. Like the player 113, the player 123 is also operable to play digital content objects using a similar method.

According to an embodiment, TPMs are used to assist in securely transferring data objects between devices. For example, a user purchased content and receives the digital content object O1, for example, as a file including the purchased content. The digital content object O1 is received encrypted with the key K1, E[K1,O1], which is shown as 101a in FIG. 1. For example, E[K1,O1] is received at the device 110 via the player 113, and the encryption/decryption key K1 is stored in a key table 114 in the TPM 111. Instead of the player 113, other software may be used for downloading content and storing keys in the TPM 111. To play the digital content object O1, the player 113 extracts the key K1 from the TPM 111 for decrypting and playing the object content O1, as described above.

Information exchanges 130 are examples of information exchanged between the devices 110 and 120 when transferring data objects between the devices 110 and 120. For example, when the user desires to transfer the digital content object O1 to the device 120, the TPM 111 sends a request to transfer content to the TPM 121 on the device 120 if the digital content object O1 is to be pushed to the device 120. The user may provide a user indication to transfer the data object to the device and the request to transfer is sent in response to the user indication. The digital content object O1 may alternatively be pulled by the device 120 from the device 110.

Prior to exchanging sensitive information, such as decryption keys, for transferring the digital content object O1 to the device 120, the TPMs 111 and 121 establish a secure and authenticated channel. For example, the TPMs 111 and 121 mutually authenticate each other using digital certificates signed by the TA. In addition to verifying the authenticity of each other, this step may be used to guarantee that the other TPM will follow the protocol including the steps described herein for transferring data objects. Message exchanges may not be performed or may be terminated if either of the TPMs 111 or 121 cannot be authenticated.

Session keys may be used to provide a secure channel for protect information exchanges between the devices 110 and 120 and also between the TPMs 111 and 121. However, other known techniques may be used to provide a secure channel. If session keys are used, TPMs 111 and 121 agree on a session key, Ks, to encrypt their communications.

The TPM 121 receives the request for transfer from the TPM 111, and generates a new encryption/decryption key K2. The TPM 121 may generate the key K2 randomly or use another function to generate K2.

The TPM 121 encrypts K2 with the session key Ks and sends [Ks,K2] to the TPM 111 on the device 110. The TPM 111 decrypts the digital content object O1 using K1 and decrypts K2 using the session key Ks, and encrypts the digital content object O1 using the key K2 received from the TPM 121.

As shown in FIG. 1B, after the TPM 111 encrypts the digital content object O1 with K2, referred to as E[K2,O1], the TPM 111 deletes both K1 and K2. At this time, the TPM 111 cannot access the digital content object O1 and does not have a playable copy of the digital content object O1. The TPM 111 transmits E[Ks,E[K2,O1]] to the TPM 121, which is the digital content object O1 encrypted with the key K2 and transmitted to the TPM 121 encrypted using the session key Ks. The TPM 121 decrypts E[Ks,E[K2,O1]] using the session key Ks and stores 101b in the device 120, which includes E[K2,O1]. At this time or any time after the TPM 111 deletes K2, the digital content object O1 can only be played on the device 120. Also, E[K2,O1] may be deleted from the device 110 after sending E[K2,O1] to the device 120 and confirming the receipt of E[K2,O1]. As shown in FIG. 1B, the TPM 111 may delete K1 but continue to store E[K1,O1] because O1 is not playable without K1.

Using this protocol for transferring data objects, no more than one playable copy of the digital content object O1 is available to the devices 110 and 120. Thus, the digital content object O1 takes on properties similar to a physical medium for transferring medium, such as a CD or DVD, where the content can be moved and played by different device, but not at the same time and without making copies of the content. This also allows the user to transfer content between devices without making unauthorized copies of the content.

Figure 2A:
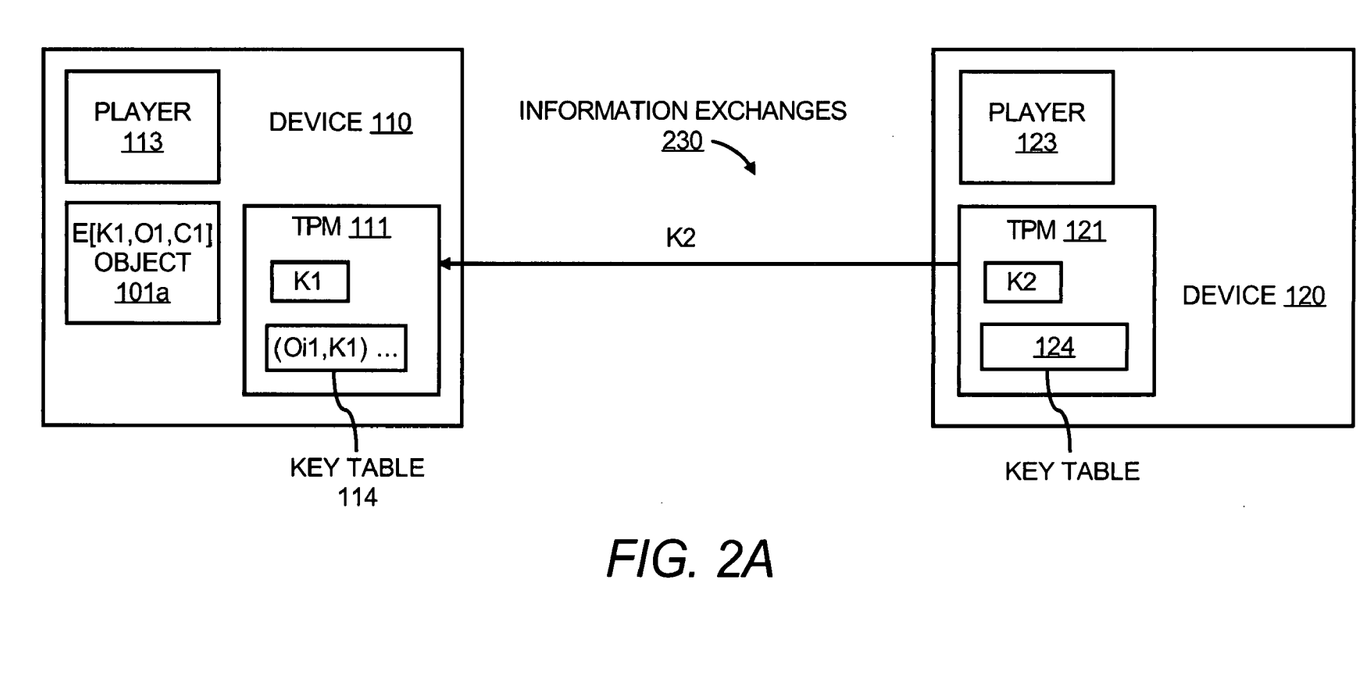
FIGS. 2A-B illustrate transferring a data object between devices, according to another embodiment.
Figure 2B:
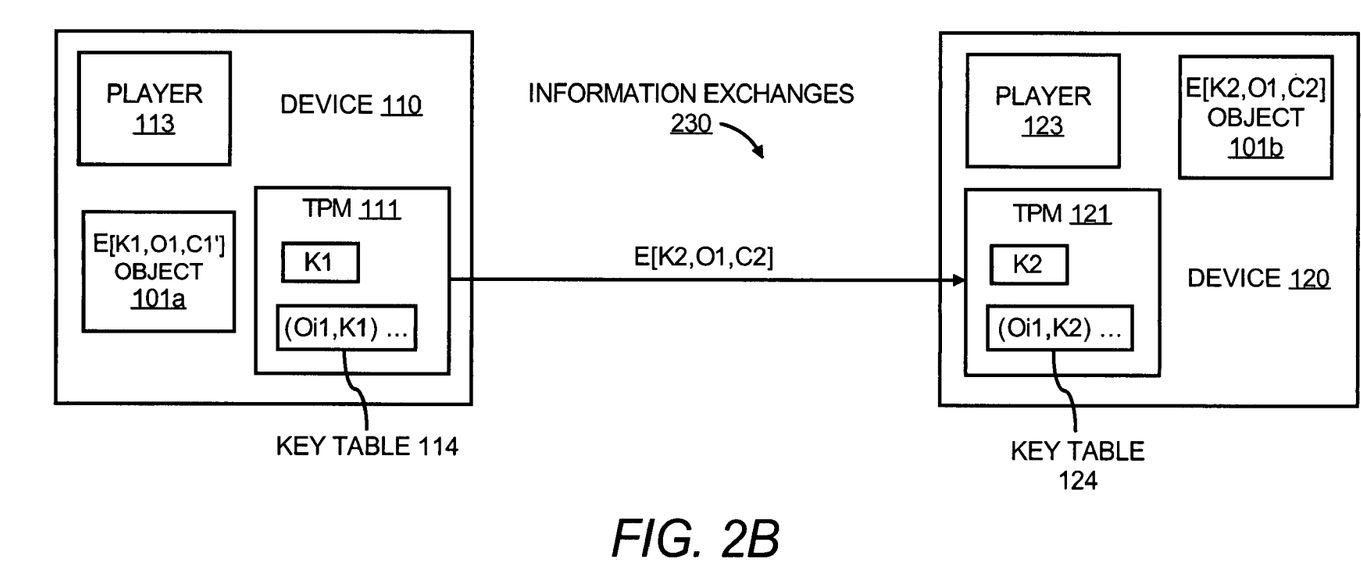

There are several variations on the transfer protocol described above. According to an embodiment, the user may have the right to own multiple copies of the digital content object O1. For example, the user may pay an additional fee to have the right to own multiple copies or the user is authorized to have a predetermined number of copies greater than 1 for a single fee. In this embodiment, a copy regulation value may be used to regulate the number of copies that can be made. For example, the copy regulation value is set at the number of copies that are authorized to be made, and the copy regulation value is decremented for each copy. A copy regulation value may be tagged to a digital content object, for example, as metadata. FIGS. 2A-B show the copy regulation values C1 and C2 stored with the encrypted digital content object O1 as 101a and 101b respectively. A key table may store a copy regulation value or it may be stored elsewhere, such as with the encrypted digital content object. The player 113 or other software requests the TPM 111 to make a copy of the digital content object O1, which may include transferring a copy to the device 120. If C1 is greater than zero, then the TPM 111 may give permission to make a copy. For example, if C1=5, and 3 copies of the digital content object O1 are distributed to the device 120, then a copy of the digital content object O1 at the device 110 is tagged with a copy regulation value of 2 and a copy of the digital content item transferred to the device 120 is tagged with a copy regulation value of 3. Thus, the device 110 can have 2 authorized copies and the device 120 can have 3 authorized copies. As shown in FIG. 2B, the updated copy regulation value in the device 110 is shown as C1', which is 2 in this example as described above. The TPM 111 sends the digital content object O1 and the copy regulation value C2 encrypted with the key K2. C2 is 3 in this example. The key K2 may have been received using the protocol described above as part of the information exchanges 230. Also, although not shown, a session key or other secure transmission technique may be used and digital content object ID/key pairs may be stored in the TPMs in the embodiments described with respect to FIG. 2 and the embodiments described below.

Figure 3:
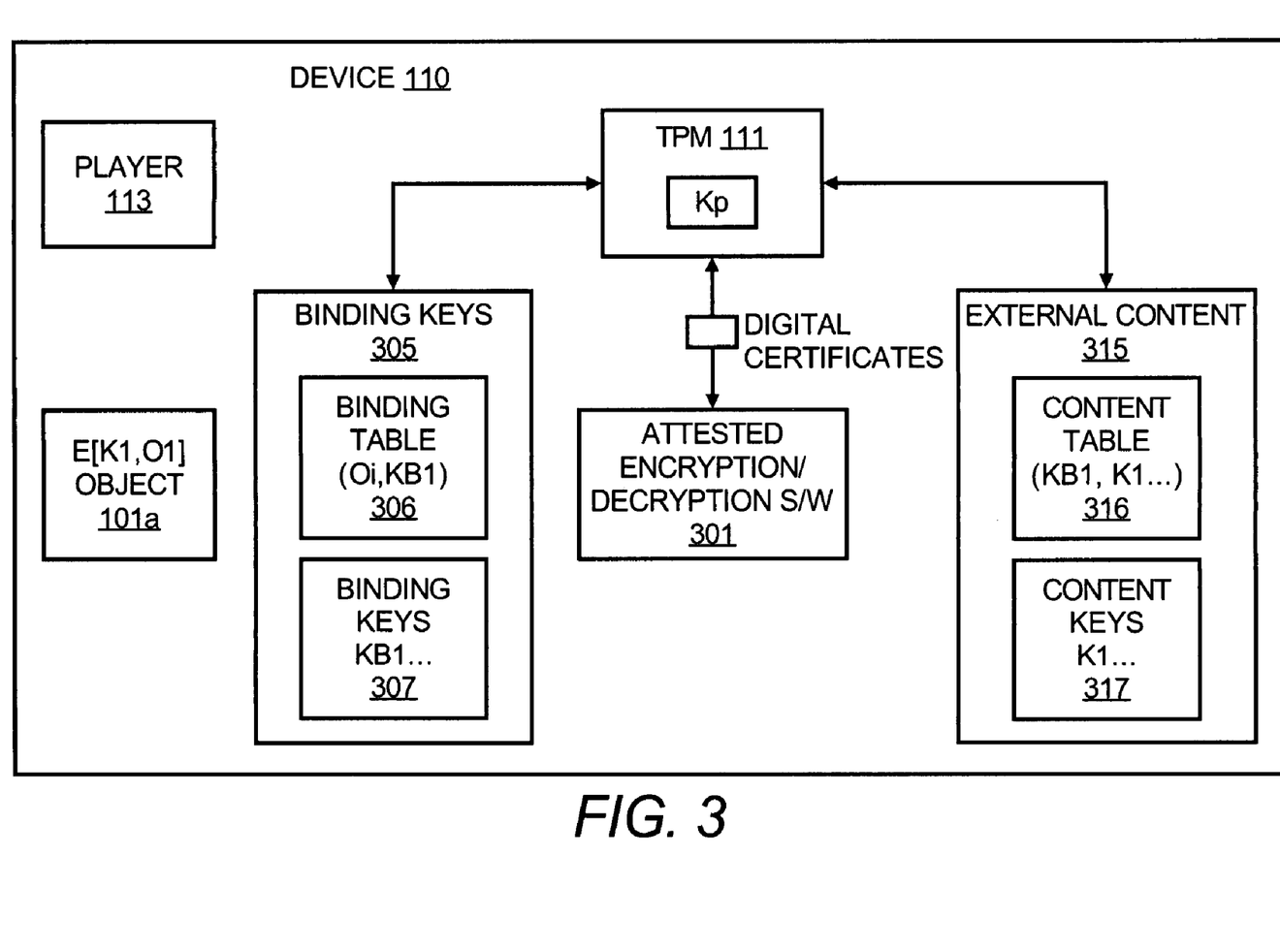
FIG. 3 illustrates use of external software and external keys and tables for transferring data objects, according to another embodiment.

Digital content objects may include large media files and decrypting and re-encrypting the media files in a TPM may exceed the processing capability of the TPM or may take too long and adversely affect the performance for transferring digital content objects from one device to another. According to an embodiment, encrypting and decrypting data objects is performed by software outside the TPM. FIG. 3 shows software 301 in the device 110 operable to encrypt and decrypt data objects. Digital certificates exchanged between the software 301 and the TPM 111 are used for attestation of the software 301. If the software 301, or any of the underlying system, such as the OS, has been tampered with, the attestation fails, and the TPM 111 will not release keys to the software 301.

After attestation of the software 301, the TPM 111 may provide the software 301 with keys for encrypting and decrypting data objects. Although the device 120 is not shown, the device 120 may also include software outside the TPM 121 for encrypting and decrypting data objects, and transferring data objects may be performed as described above except encrypting and decrypting digital content objects are performed outside the TPMs 111 and 121.

FIG. 3 also shows an embodiment with multiple layers of indirection. In this embodiment, the multiple layers include private storage of external binding keys 305 and external content keys 315 secured by an encryption key Kp stored in the TPM 111. Another layer is the binding keys 307. For example, each content key is encrypted with a binding key. Thus, the TPM 111 searches a binding key table 306 with a digital content object identifier, such as Oi1, to identify the corresponding binding key kb1. The TPM 111 retrieves Kb1 from the external binding keys 305. Another layer is the content keys 317. For example, the TPM 111 searches a content key table 114 with an identifier for the binding key Kb1 to identify the corresponding content key, which is K1 in this example, and the TPM 111 retrieves K1 from the external content keys 305. K1 may be used to decrypt the digital content object O1 for playing or transferring O1 to another device. Alternatively, instead of transmitting an encrypted digital content object to another device, only K1 is transmitted to transfer a data object, which is described below with respect to FIGS. 4A-B.

As shown in FIG. 3, keys are stored outside the TPM 111 in an external key table 314, which may be stored in memory or another computer readable medium in the device 110 external to the TPM 111. There are likely to be so many digital content objects or keys on a device, such as the device 110, that the TPM 111 has insufficient memory to store keys for all the digital content objects. Thus, the keys may be stored on the device 110 outside of the TPM 111.

As described above, copying performance may be adversely affected if the TPMs 111 and 121 need to encrypt and decrypt large media files. According to an embodiment, locker keys are used, leaving the TPMs 111 and 121 to encrypt and decrypt locker keys rather than digital content objects and to transfer data objects comprised of keys from one device to another rather than re-encrypted digital content objects.

Figure 4A:
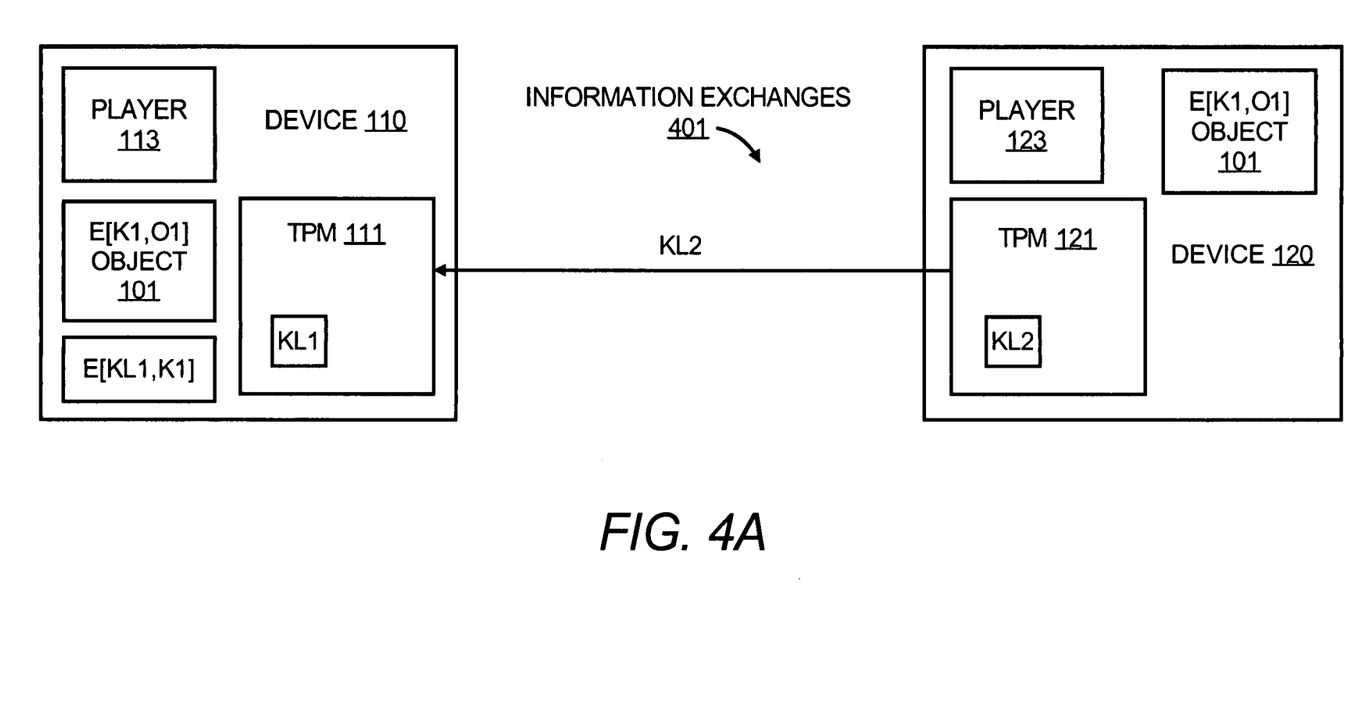
FIGS. 4A-B illustrate transferring a data object between devices, according to yet another embodiment.
Figure 4B:
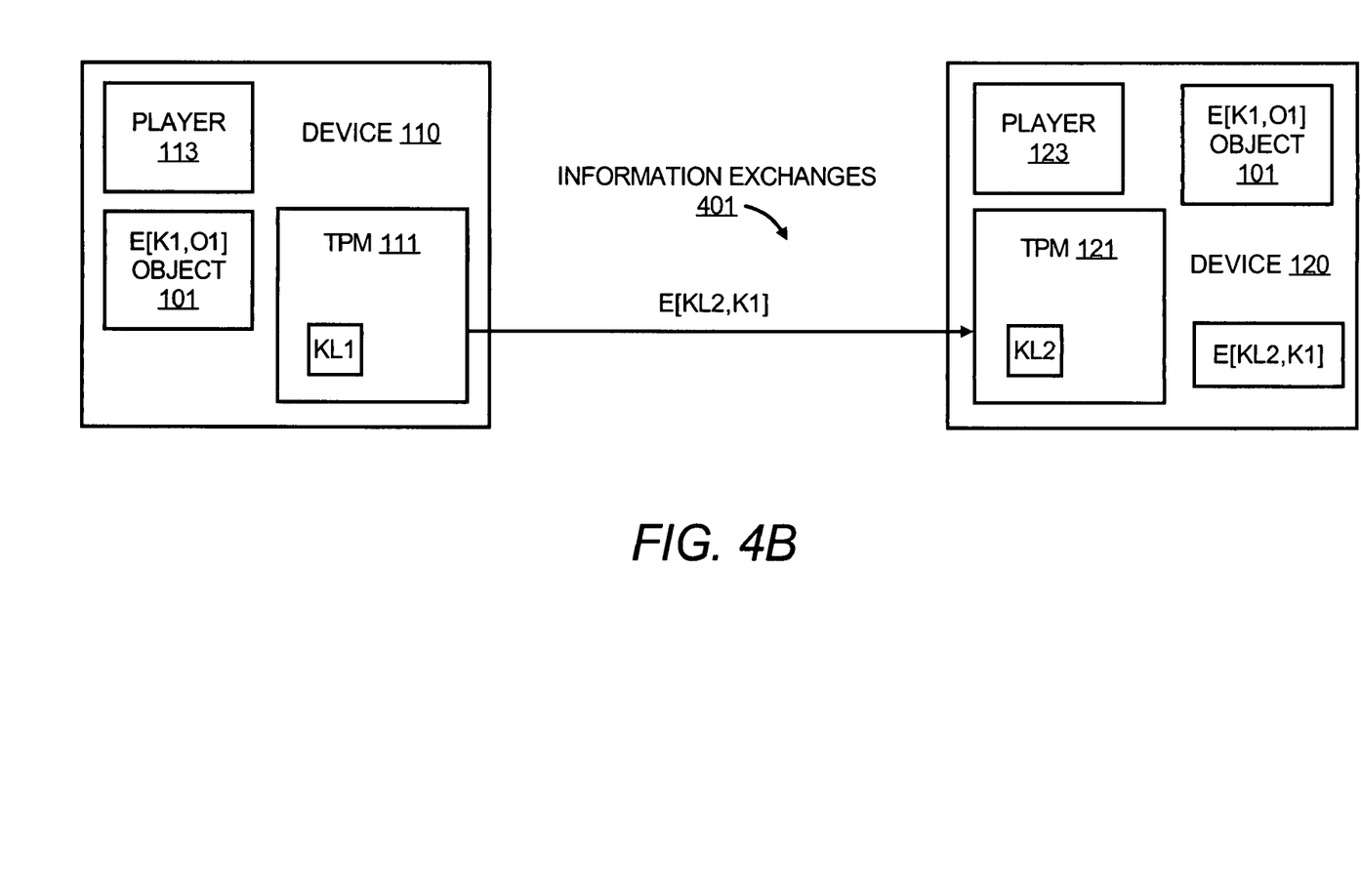

FIGS. 4A-B illustrate using locker keys to transfer the digital content object O1 from the device 110 to the device 120, according to an embodiment. The digital content object O1 is encrypted with the key K1 and is shown as 101, E[K1, O1]. The encrypted digital content object 101 may be stored on both devices 110 and 120. However, the devices 110 and 120 at this time do not have the key K1, so the devices 110 and 120 cannot play the digital content object O1 or only one of the devices has the key K1.

Each of the TPMs 111 and 121 stores a unique locker key, KL1 and KL2, respectively. The device 110 receives E[KL1, K1], for example, from a source (not shown, such as the content owner) providing the encrypted digital content object 101. The locker keys may be asymmetric keys so the source can encrypt K1 with the public key of a TPM and only the TPM can decrypt K1, assuming only the TPM knows its private key. E[KL1, K1] and E[KL2, K1] are shown external to the TPMs 111 and 121, respectively, however, E[KL1, K1] and E[KL2, K1] may be stored in the TPMs 111 and 121, respectively. The TPM 111 decrypts the key K1 using the locker key KL1 and the player 113 can then decrypt and play the content O1 using the key K1. The device 120, however, cannot play the digital content object O1 at this time, because the device 120 does not have the key K1, as shown in FIG. 4A.

To transfer the digital content object O1 to the device 120, only the data object associated with the digital content object, which is the key K1 in this example, is transferred because 101 may already be stored on the device 120. For example, as shown in FIG. 4B, the TPM 121 sends KL2 to the TPM 111. The TPM 111 encrypts K1 with KL2 and deletes KL2 and K1. The TPM sends K1 encrypted with KL2, E[KL2,K1] to the TPM 121. The TPM 121 may then decrypt K1 and the player 123 may decrypt and play the encrypted digital content object 101.

The TPM 111 disables the digital content object O1 so both devices 110 and 120 do not have playable copies. Disabling may be performed before sending K1 to the device 120. Disabling may include deleting KL2 and K1 from the device 110. Instead, the TPM 111 may delete an entry in the key table 114 for (O1i,K1) if data object ID/key pairs are stored in the key table 114. However, K1 may be saved and used to decrypt other data objects, possibly provided to the device 110 from the same source or publisher. For example, several digital content objects may be encrypted with the same key K1. Instead of having to decrypt the key K1 each time using the locker key KL1, the key K1 is decrypted and stored. Then, the key K1 need not be decrypted to play another digital content object encrypted with the key K1. If the key table 114 grows too large, keys may be deleted.

Locker keys may not be used in another embodiment. Then, K1 is transmitted to the device 120 and the digital content object O1 is disabled at the device 110. In yet another embodiment, multiple levels of indirection, such as described with respect to FIG. 3, may be used in the embodiments described with respect to FIG. 4 and for other embodiments described herein.

Figure 5A:
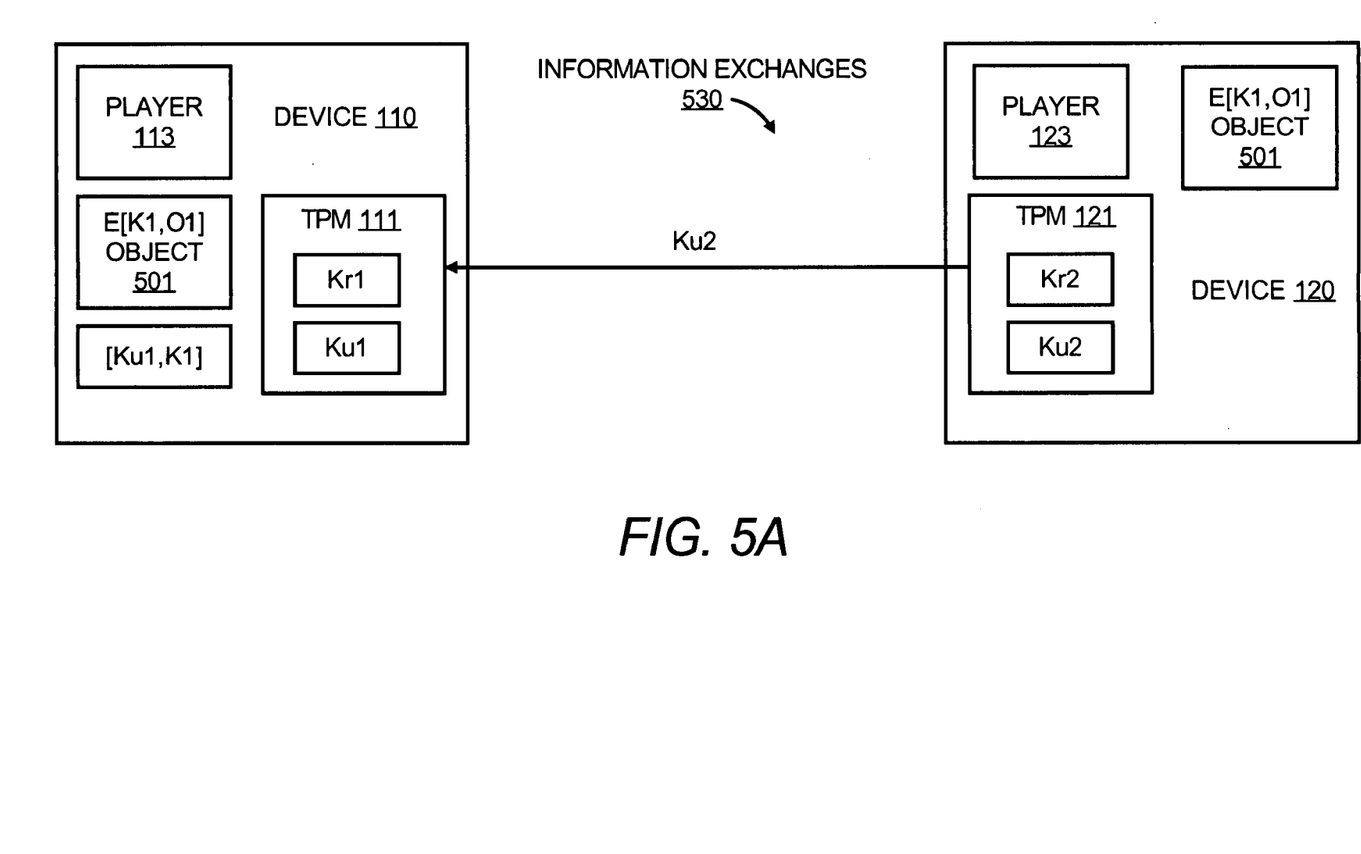
FIGS. 5A-B illustrate transferring a data object between devices, according to yet another embodiment.
Figure 5B:
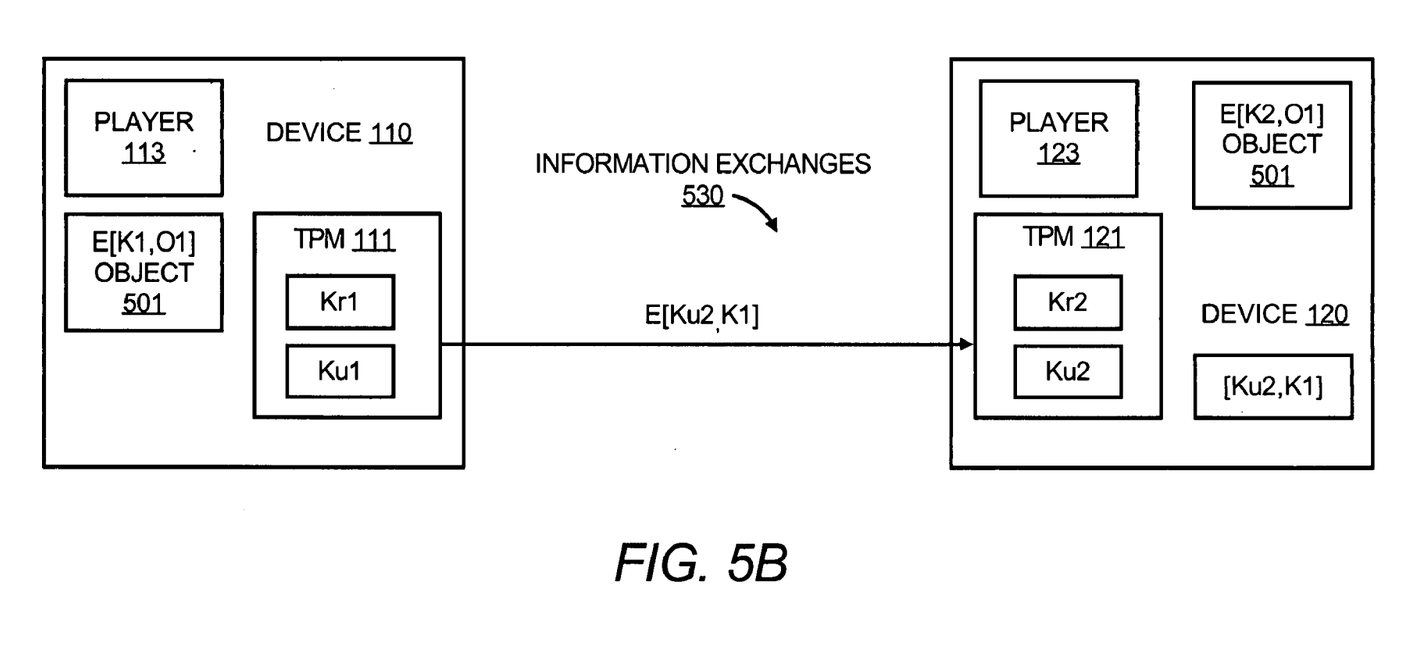

According to an embodiment, asymmetric encryption is used to encrypt and decrypt data objects. The TPMs 111 and 121 each have a private/public key pair, (Kr,Ku). For example, (Kr1,Ku1) is the private/public key pair for the TPM 111, and (Kr2,Ku2) is the private/public key pair for the TPM 121, such as shown in FIGS. 5A-B.

The public keys Ku1 and Ku2 may be published by the respective TPMs, however, the corresponding private keys Kr1 and Kr2 are only known to the respective TPMs. Ku1 and Ku2 may be used for encryption and the private keys Kr1 and Kr2 may be used for decryption. The digital content object O1 may be encrypted with a content key K1, shown as object 501. Object 501 may be stored in both devices 110 and 120, however, the devices 110 and 120 may not have the content key K1 and the digital content object O1 is not playable. The device 110 publishes its public key Ku1 to a source (not shown), for example, providing O1. The device 110 receives (Ku1,K1). Then, the TPM 111 may decrypt K1 with Kr1 and play O1.

Regarding the information exchanges 530, in order to transfer O1, the data object K1 is transmitted to the device 110. For example, the TPM 121 sends its public key Ku2 to the TPM 111. The TPM 111 encrypts K1 with the public key Ku2, E[Ku2,K1]. After the TPM 111 encrypts the digital content object O1 with the public key Ku2, the TPM 111 disables O1, for example, by deleting K1 and/or 501 or by deleting an entry in a table if a table is used such as described above. Disabling may be performed before sending K1 to the device 120. After disabling, the TPM 111 cannot play the digital content object O1. As shown in FIG. 5B, the TPM 111 transmits E[Ku2,O1] to the TPM 121 and it is stored in the device 110 as 503. The digital content object O1 can now be decrypted using the private key Kr2 and K1 and played by the player 123 on the device 120. At this time or any time after the TPM 111 disables O1, the digital content object O1 can only be played on the device 120. Also, E[Ku2,O1] may be deleted from the device 110 after sending E[Ku2,K1] to the device 120.

The TPMs 111 and 121 may be operable to generate the symmetric keys and asymmetric key pairs using encryption algorithms known in the art. Generating keys may be computationally expensive for the TPMs 111 and 121. Thus, the keys may be generated while the TPMs 111 and 121 are idle and the keys may be stored for later use. Also, locker keys may be used, such as described with respect to FIG. 4, for asymmetric encryption.

Although not shown in FIGS. 5A-B, session keys, a request to transfer, and mutual authentication of the TPMs 111 and 121 using digital certificates, as described above with respect to the information exchanges 130 shown in FIG. 1, may be used in the information exchanges 530.

One or more of the embodiments described above may be used together. For example, either asymmetric or symmetric encryption and decryption may be used with one or more of the embodiments described with respect to FIG. 3. Also, FIGS. 1-5B only show one digital content object O1, but devices may typically store many data objects.

Figure 6:
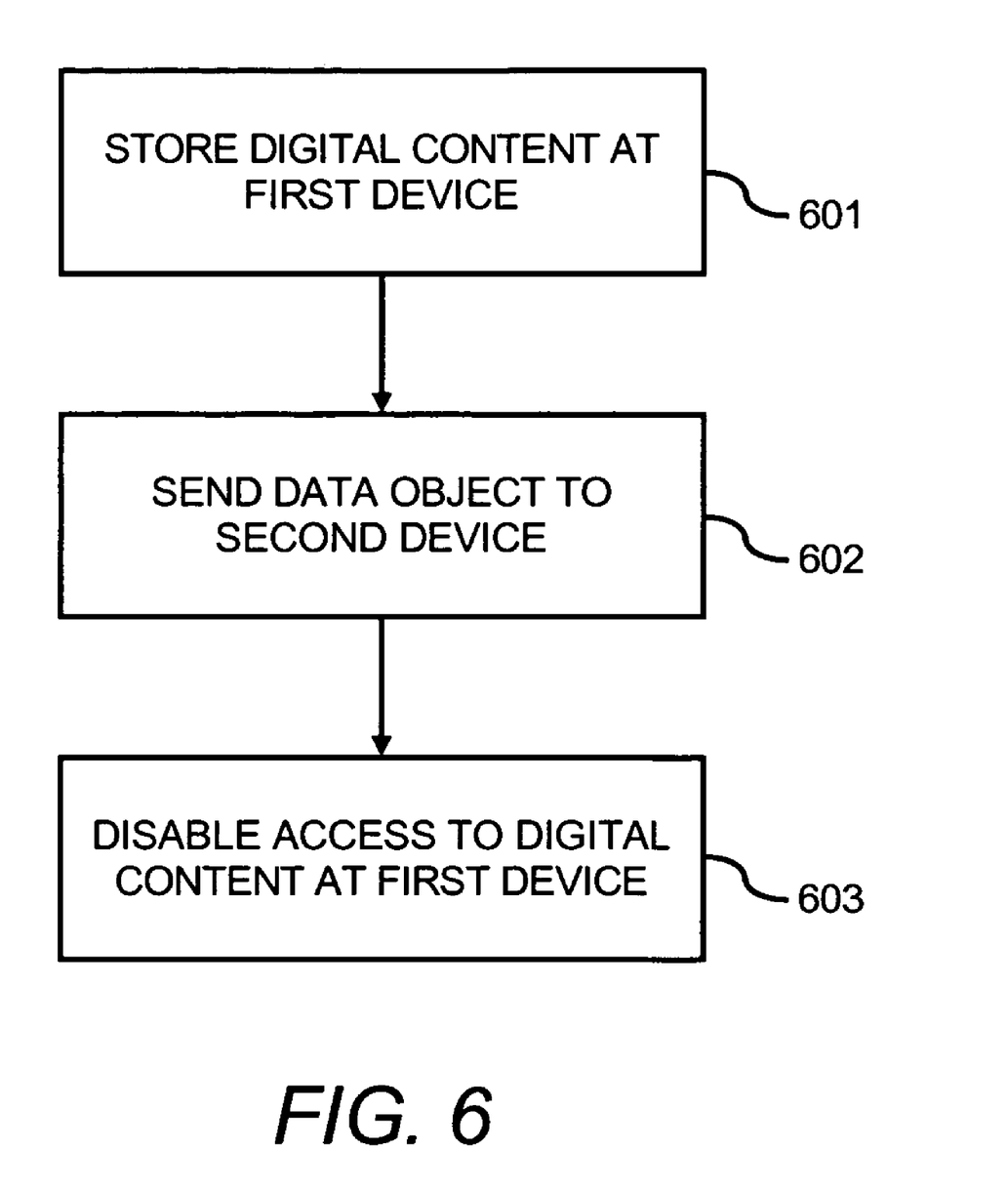
FIG. 6 illustrates a flow chart of a method for transferring a data object between devices, according to an embodiment.

FIG. 6 illustrates a flow chart of a method 600 for transferring a data object associated with a digital content object. The method 600 is described with respect to FIGS. 1A-B and 2A-B by way of example and not limitation and the method 600 may be performed in other systems.

At step 601, the device 110 stores a playable copy of digital content, such as the digital content object O1. For example, the digital content object O1 may be encrypted with the symmetric key K1, shown as 101a in FIG. 1A, or encrypted using an asymmetric key. The digital content object O1 may be played by the player 113 if the player 113 gets K1 from the TPM 111 in the embodiment shown in FIG. 1A.

At step 602, the device 110 sends a data object to the device 120. The data object is associated with the stored digital content object. For example, the data object may include the digital content object, such as the encrypted digital content object or the encrypted digital content object with copy regulation value, shown in FIGS. 1A-B and 2A-B, respectively, or the data object may be an encryption key for the digital content object, such as shown in FIGS. 4A-B and 5A-B.

At step 603, the device 110 disables access to the digital content object, so the digital content object cannot be played on the device 110, but may be played on the device 120. Thus, at any given time only an authorized copy of the digital content object is operable to be played on the first device or the second device. Disabling may include deleting a digital content object, deleting a content key or a locker key for the digital content object or deleting an identification of the digital content object or key from a table.

Figure 7:
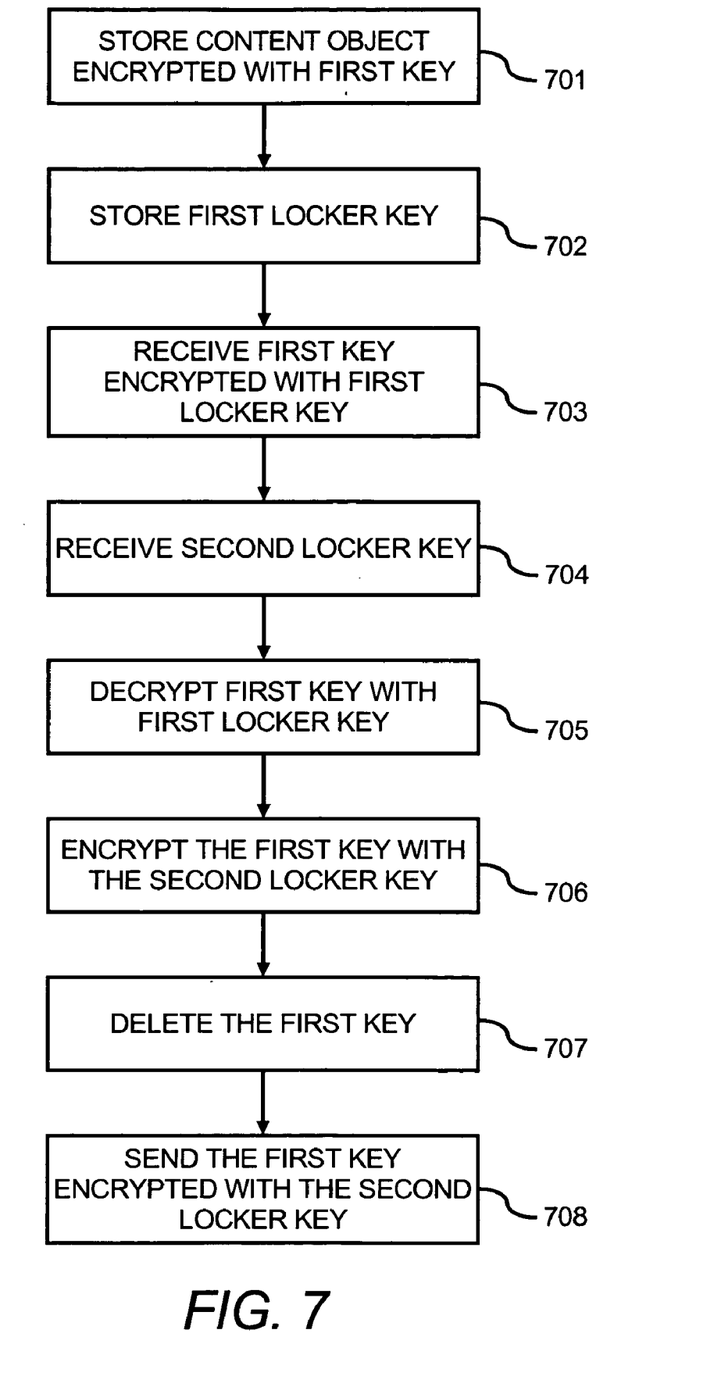
FIG. 7 illustrates a flow chart of a method for transferring a data object between devices, according to another embodiment.

FIG. 7 illustrates a flow chart of a method 700 for transferring a data object using a locker key. The method 700 is described with respect to FIGS. 4A-B by way of example and not limitation and the method 700 may be performed in other systems.

At step 701, the device 110 stores a data object, such as the digital content object O1. The digital content object O1 is encrypted with a first key. For example, the digital content object O1 may be encrypted with the symmetric key K1 or encrypted using an asymmetric key.

At step 702, the device 110 stores a first locker key, such as the locker key KL1 shown in FIG. 4A, for the TPM 111.

At step 703, the device 110 receives the first key, such as the key K1, encrypted with the locker key KL1.

At step 704, the device 110 receives a second locker key, such as the locker key KL2 from the device 120. For example, the TPM 111 receives the locker key KL2 from the TPM 121.

At step 705, the device 110 decrypts the key K1 with the locker key KL1. The decryption may be performed by the TPM 111 or other software.

At step 706, the device 110 encrypts the key K1 with the locker key KL2 received from the TPM 121. The encryption may be performed by the TPM 111 or other software.

At step 707, the device 110 deletes the key K1 and sends E[KL2,K1] to the device 120 at step 708, such as shown in FIG. 4B. The TPM 111 may delete the key K1 and send E[KL2,K1] to the TPM 121. The TPM 121 is then operable to decrypt the key K1 and then the key K1 may be used to decrypt and play the digital content object O1.

According to an embodiment, at any time during the transfer process as described above in the methods 600 and 700 and other steps described herein, if communication between the TPMs 111 and 121 is stopped or if the transfer process is otherwise halted before completion, there is no more than one playable copy of the digital content object O1 available to both of the devices 110 and 120. According to another embodiment, the user is authorized to have a predetermined number of copies of the digital content object O1, which may be greater than one copy. Then, no more than the predetermined number of playable copies of the digital content object O1 are available to both of the devices 110 and 120. As described above, a copy regulation value may be used to track the number of copies. Also, one or more of the steps described in FIGS. 600 and 700 may be performed in different orders.

Also, the methods 600 and 700 described above and other methods described herein may be used in a protocol for transferring digital content objects without making unauthorized copies. Enforcing the protocol gives a digital content object a physical transfer property. The physical transfer property includes having no more than an authorized number of playable copies of the digital content on one of a plurality of devices at any given time, including when the digital content is stored on first device, during a transfer to a second device and after the transfer to the second device. Furthermore, the protocol is enforced by the first and second devices. An embodiment of the devices is described with respect to FIG. 8.

Figure 8:
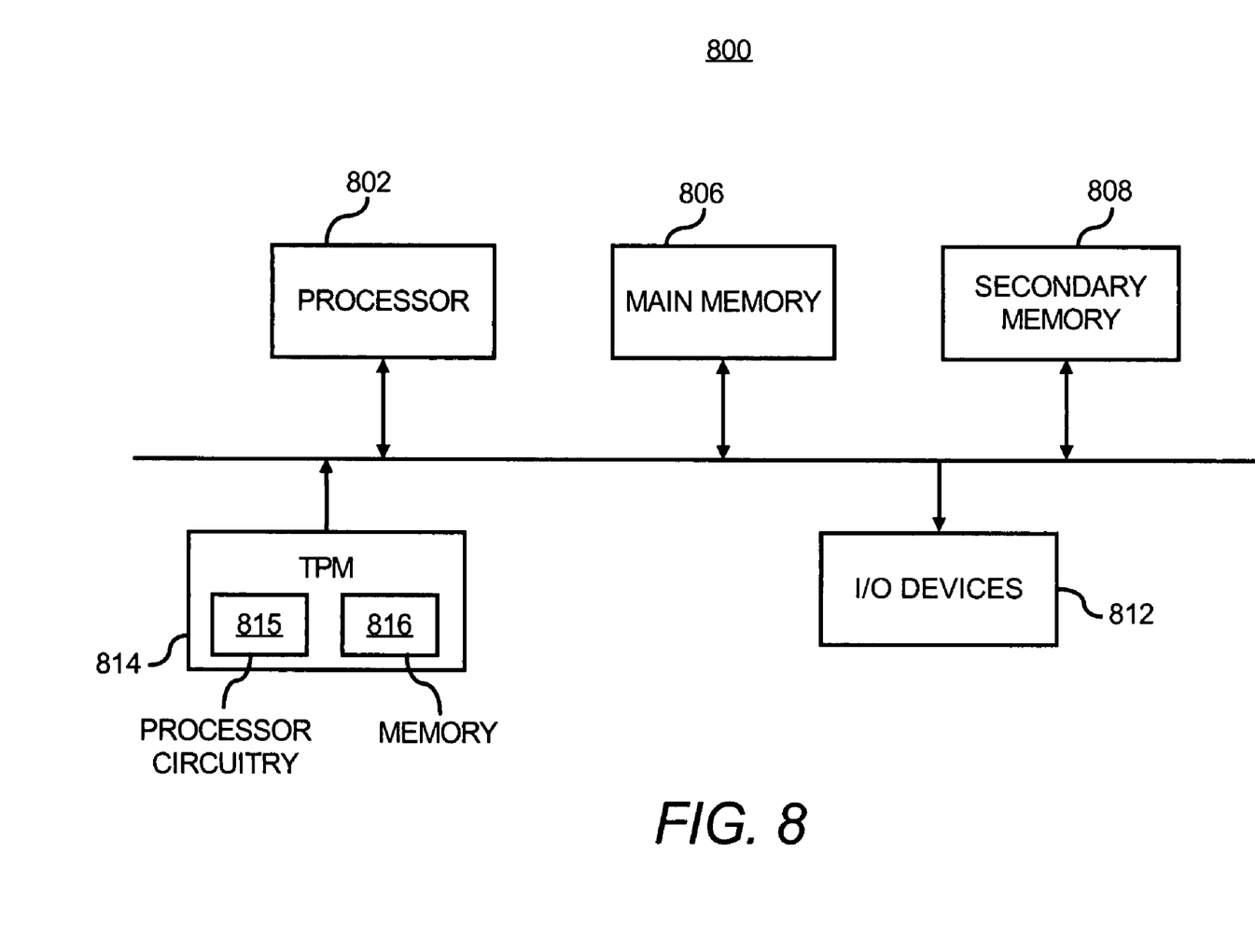
FIG. 8 illustrates a device, according to an embodiment.

Referring to FIG. 8, a schematic block diagram of a computer system 300 is shown in accordance with an embodiment. The computer system 300 shown may be used as a platform for the devices 110 and 120.

The computer system 800 includes one or more processors, such as processor 802, providing an execution platform for executing software. Instead of a processor, other circuits may be used to perform the functions described herein, such as an ASIC or other circuits designed to perform the functions. Commands and data from the processor 802 are communicated over a communication bus 804. The computer system 800 also includes a main memory 806, such as a random access memory (RAM), where software may be resident during runtime, and a secondary memory 808. The secondary memory 808 includes, for example, a hard disk drive or other type of storage device. Other examples of the secondary memory 808 include ROM (read only memory), EPROM (erasable, programmable ROM), EEPROM (electrically erasable, programmable ROM).

The computer system 800 optionally includes user interfaces comprising one or more input/output (I/O) devices 812, such as a keyboard, a mouse, a stylus, display, speakers, and the like. A network interface 810 may be provided for communicating with other computer systems.

The computer system 800 also includes a TPM 814. The TPM 814 may include processor circuitry 815 and a memory 816. The architecture of the TPM 814 may the same or similar for the TPMs 111 and 121. One or more of the steps described herein may be provide as software stored on a computer readable medium, such as the processor circuitry 815 and/or the memory 806.

It will be apparent to one of ordinary skill in the art that FIG. 8 is meant to illustrate a generic computer system. Any type of computer system may be used. Furthermore, one or more components of the components of the computer system 800 are optional. The computer system 800 may include more or less features depending on the complexity of the system needed.

One or more of the steps of the methods 600 and 700 and other steps described herein may be implemented as software embedded or stored on a computer readable medium. For example, one or more of the steps may be software stored in the memory 815 in the TPM or the memory 806 or other storage in the device. The software may be executed by a processor or processor circuitry, such as the processor circuitry 816, in the TPM or one or more of the steps may be executed by a processor, such as the processor 802, or processor circuitry in the device. The steps may be embodied by a computer program, which may exist in a variety of forms both active and inactive. For example, there may exist as software program(s) comprised of program instructions in source code, object code, executable code or other formats for performing some of the steps when executed, for example, by the processor 802. Any of the above may be stored on a computer readable medium, which include storage devices, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Concrete examples of the foregoing include distribution of the programs or content on a CD ROM or via Internet download. It is therefore to be understood that those functions enumerated herein may be performed by any electronic device capable of executing the above-described functions.

What is claimed is:

1. A method of transferring a data object between devices, wherein the data object is associated with controlling a playability of a digital content object, the method comprising:
   storing a playable copy of the digital content object at a first device, wherein the digital content object is encrypted with a first key;
   receiving at the first device a second key from a second device;
   decrypting the digital content object using the first key;
   encrypting the decrypted digital content object using the second key to obtain the data object;
   sending the data object associated with the digital content object to the second device; and
   disabling the playable copy of the digital content object at the first device, such that only an authorized, playable copy of the digital content object is stored on the first device or the second device at any given time before, during and after sending the data object.

2. The method of claim 1, wherein disabling the playable copy of the digital content object at the first device comprises:
   deleting the first key and the second key at the first device before the sending the data object to the second device.

3. The method of claim 2, wherein the first key comprises a content key or a locker key.

4. The method of claim 1, wherein disabling the playable copy of the digital content object at the first device comprises deleting at least one of an identification of the stored digital content object and an identification of the first key used to play the digital content object.

5. The method of claim 1, wherein the authorized, playable copy of the digital content object comprises only a single, authorized copy of the digital content object that is stored on the first device or the second device at any given time.

6. The method of claim 1, further comprising:
   privately storing the data object with the assistance of trusted hardware in the first device and the second device.

7. The method of claim 1, wherein storing the playable copy of the digital content object at the first device comprises:
   storing the digital content object in trusted hardware.

8. The method of claim 7, wherein the trusted hardware comprises a trusted platform module.

9. The method of claim 1, wherein storing the playable copy of the digital content object at the first device comprises:
   storing the digital content in memory secured by but external to the trusted hardware.

10. The method of claim 1, wherein the authorized, playable copy of the digital content object comprises multiple authorized copies, the method further comprising:
    storing a copy regulation value in the first device indicating a number of playable, authorized copies of the digital content object, n, where n>1;
    sending an indication of a number of playable, authorized copies of the digital content object, m, from the number of copies, n, being transferred to the second device, where m<n;
    updating the copy regulation value in the first device to be equal to n−m.

11. The method of claim 10, further comprising:
    storing a copy regulation value in the second device indicating the number of playable, authorized copies of the digital content object, m, transferred to the second device.

12. The method of claim 10, further comprising:
    preventing copying of the playable digital content object in the first device if the copy regulation value in the first device reaches zero; and
    preventing copying of the playable digital content object in the second device if the copy regulation value in the second device reaches zero.

13. The method of claim 1, further comprising:
    receiving the digital content object encrypted with the first key, wherein the first key is a content key; and
    receiving the first key encrypted with an asymmetric or symmetric key known by trusted hardware in the first device.

14. The method of claim 13, wherein sending the data object associated with the digital content object to the second device comprises:
    decrypting the first key with the asymmetric or symmetric key known by the trusted hardware in the first device; and
    encrypting the first key with another asymmetric or symmetric key known by trusted hardware in the second device; and
    sending the first key encrypted with the asymmetric or symmetric key known by trusted hardware in the second device to the second device.

15. The method of claim 14, further comprising using a binding key to determine the first key.

16. A first device for enforcing a protocol giving digital content a physical transfer property, the first device comprising:
    a processing circuit enforcing the protocol giving the digital content the physical transfer property, the physical transfer property including having no more than an authorized number of playable copies of the digital content on one of a plurality of devices at any given time, including when the digital content is stored on the first device, during a transfer to a second device and after the transfer to the second device; and
    storage storing the digital content as an encrypted digital content object using a first key,
    wherein the first device is operable to receive a second key from the second device, decrypt the encrypted digital content object using the first key, encrypt the digital content object using the second key to obtain a data object, send the data object associated with the encrypted digital content object to the second device for transferring at least one authorized playable copy of the number of authorized playable copies to the second device, and disable access to at least one authorized playable copy at the first device including deleting the first key and the second key before sending the data object to the second device.

17. A computer program embedded on a non-transitory computer readable storage medium, the computer program including instructions that when executed by a processing circuit implement a method comprising:

enforcing a protocol giving digital content a physical transfer property, the physical transfer property including having no more than an authorized number of playable copies of the digital content on one of a plurality of devices at any given time, including when the digital content is stored on a first device, during a transfer to a second device and after the transfer to the second device, wherein the digital content is encrypted using a first key when the digital content is stored on the first device, and wherein enforcing the protocol includes:

receiving a second key from the second device;
decrypting the digital content using a first key;
encrypting the decrypted digital content using the second key to obtain a data object;
sending the data object associated with the digital content to the second device to transfer at least one playable copy of the digital content to the second device; and
disabling the at least one transferred playable copy of the digital content at the first device, including deleting the first key and the second key, such that no more than the authorized number of playable copies are stored on the first and second device at any given time.

* * * * *